United States Patent [19]

Stignani

[11] 4,244,212
[45] Jan. 13, 1981

[54] FLUIDIC PRESSURE RATIO SENSOR

[75] Inventor: David A. Stignani, Shafer, Minn.

[73] Assignee: The United States of America as represented by the Secretary of the Air Force, Washington, D.C.

[21] Appl. No.: 42,470

[22] Filed: May 25, 1979

[51] Int. Cl.³ .............................................. G01F 7/00
[52] U.S. Cl. .................................... 73/115; 73/861.32; 73/700
[58] Field of Search .................... 73/194 B, 202, 212, 73/115, 700, 205

[56] References Cited

U.S. PATENT DOCUMENTS

| 1,511,765 | 10/1924 | Latham | 73/231 |
|---|---|---|---|
| 3,279,251 | 10/1966 | Chanaud | 73/194 |
| 3,559,482 | 2/1971 | Baner et al. | 73/202 |
| 3,616,693 | 11/1971 | Burgess | 73/194 |
| 3,774,447 | 11/1973 | Fitch | 73/205 |
| 3,792,609 | 2/1974 | Blair et al. | 73/205 |
| 3,890,838 | 6/1975 | Paetzold | 73/194 |
| 3,937,082 | 2/1976 | Schilling | 73/208 |

Primary Examiner—Herbert Goldstein
Attorney, Agent, or Firm—Donald J. Singer; Casimer K. Salys

[57] ABSTRACT

A pressure ratio detector having a housing with a flow channel through the housing. A plug, having helical grooves, is positioned in the flow channel. A sudden expansion region is provided in the flow channel downstream of the plug which induces a nutation in the flow. The acoustic nutational frequencies are measured with a piezoelectric transducer to provide an output signal proportional to the pressure ratio across the device. An orifice device is provided in the inlet to adapt the device for measuring pressure ratios greater than 2.0.

2 Claims, 4 Drawing Figures

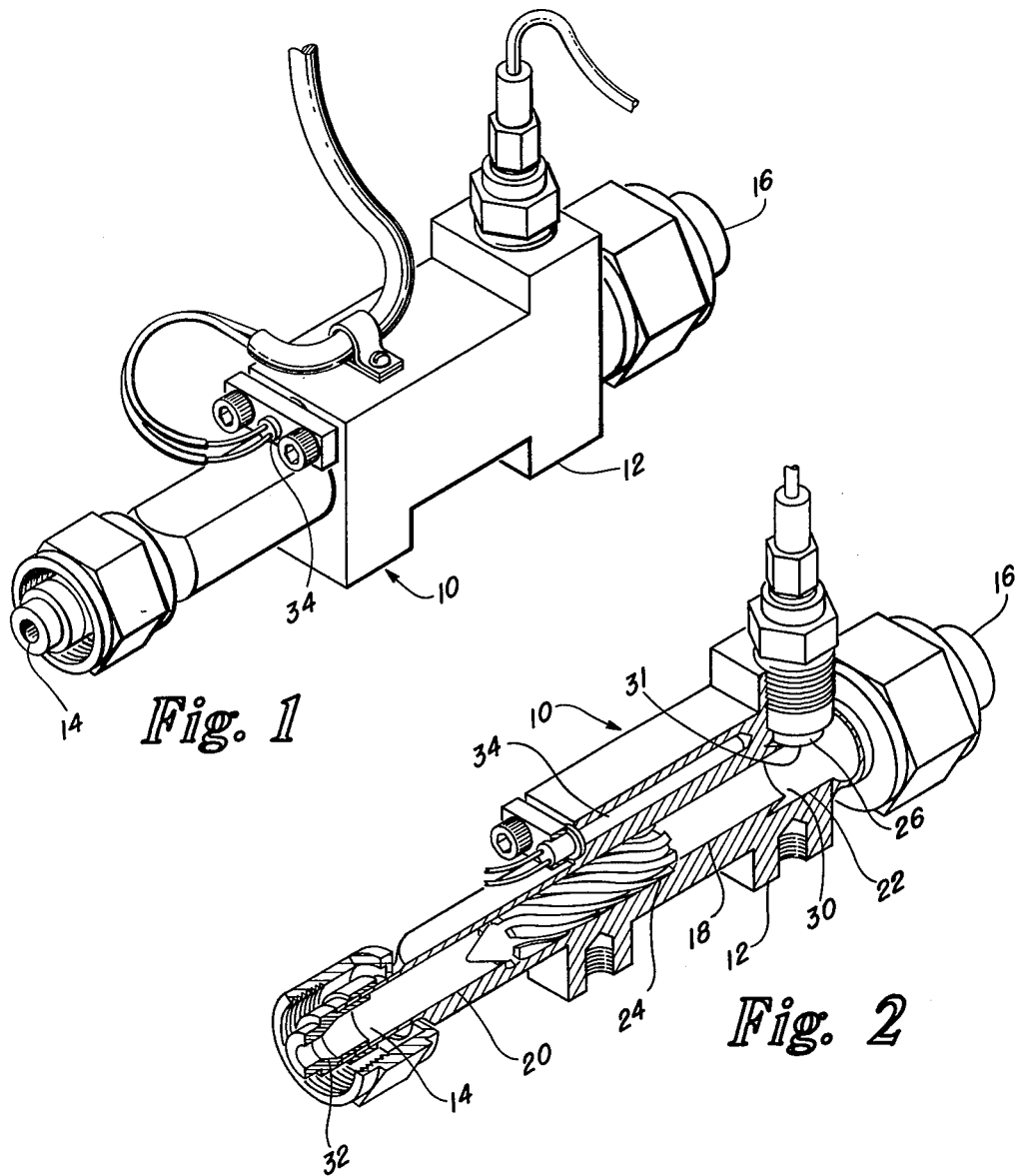
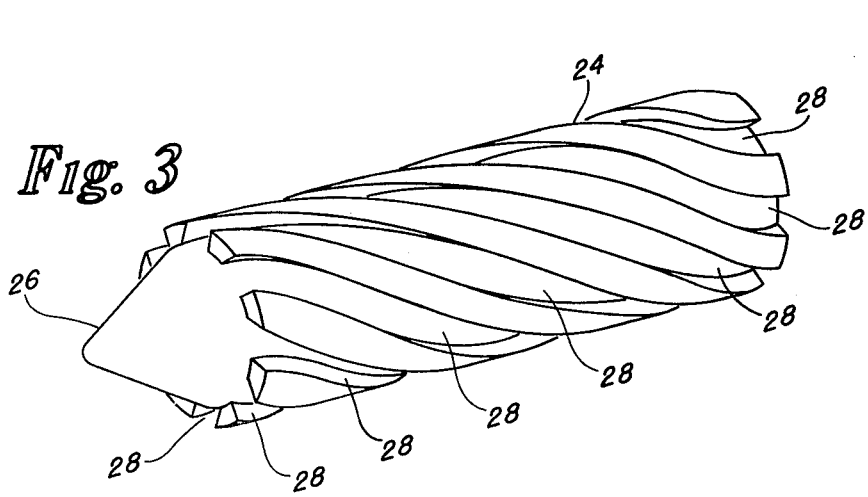

FLUIDIC PRESSURE RATIO SENSOR

RIGHTS OF THE GOVERNMENT

The invention described herein may be manufactured and used by or for the Government of the United States for all governmental purposes without the payment of any royalty.

BACKGROUND OF THE INVENTION

This invention relates to an apparatus for measuring the ratio of two pressures.

The patents to Hartig et al., U.S. Pat. No. 1,881,543; Hartig, U.S. Pat. Nos. 2,015,933; and 2,151,203; Wolff, U.S. Pat. No. 2,274,262; Welkowitz, U.S. Pat. No. 2,959,054; and Liston et al., U.S. Pat. No. 3,443,433, disclose various types of flow meters. Devices which use fluidic signals to indicate flow are described in the patent to Beeken, U.S. Pat. No. 3,600,612, and in an article by Bernard Vonnegut, "A Vortex Whistle", in The Journal of the Acoustical Society of America, Volume 26, Number 1, January 1954.

BRIEF SUMMARY OF THE INVENTION

According to this invention, a device is provided for measuring the ratio of two pressures which is substantially independent of the absolute level of the pressures. The device can be used for measuring the pressure ratio between some internal engine station pressure and the engine inlet pressure while being relatively altitude insensitive. The device of the invention includes a flow channel with the inlet connected at a high pressure region and the outlet connected at a low pressure region. A plug having helical grooves is provided in the flow path to provide a helical fluid flow. The rotating flow is subjected to a sudden expansion in the flow channel to induce a nutation in the flow. A piezoelectric transducer, positioned adjacent the region of sudden expansion, senses the acoustic nutational frequency, which is a function of the pressure ratio across the device.

IN THE DRAWING

FIG. 1 is an isometric view of a fluidic pressure ratio sensor according to the invention.

FIG. 2 is a partially schematic cut away view of the device of FIG. 1.

FIG. 3 is a partially schematic isometric view of the fluted plug used in the device of FIG. 1.

DETAILED DESCRIPTION OF THE INVENTION

Figure 4:
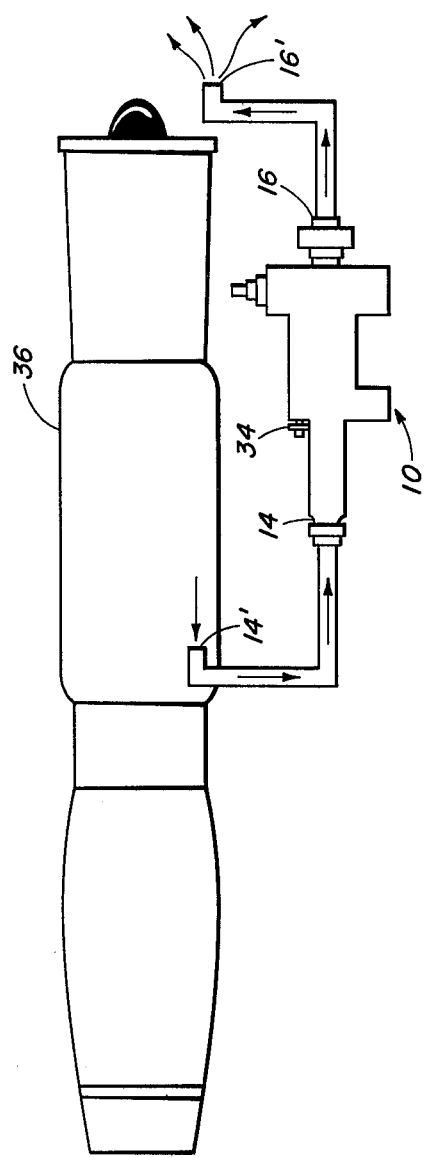
FIG. 4 is a schematic diagram showing one use for the device of the invention.

Reference is now made to FIG. 1 of the drawing which shows a pressure ratio detector 10 having a housing 12 with an inlet at 14 and an outlet at 16.

The pressure ratio detector 10 includes a flow channel 18 between the inlet 14 and the outlet 16, as shown in FIG. 2. The flow channel 18 has a smaller diameter in the section 20 near the inlet end than in the section 22 near the outlet end.

A plug 24 is positioned in the section 22 of flow channel 18 and has a conically shaped flow splitter 26 at the upstream end thereof. The plug 24 includes a plurality of helically shaped grooves 28 in the outer surface, as shown in greater detail in FIG. 3.

The junction of sections 20 and 22 forms a sudden expansion region 30 within the flow channel. The sudden expansion induces an acoustic nutational frequency in the flow. The acoustic nutational frequency is sensed with a piezoelectric transducer 26 which is positioned in the wall of housing 12 near the region 30. The inner surface 31 of the piezoelectric transducer is positioned substantially tangential with the inner wall of the larger diameter section 22.

In the operation of the device, a difference in pressure between the inlet 14 and the outlet 16 will provide a flow through channel 18 of pressure ratio detector 10. The flow through section 20 of the flow channel 18 will be divided by flow splitter 26 and will then pass through helical grooves 28. The sudden expansion of the flow in region 30 will induce nutations in the flow. The acoustic nutational frequencies are detected by the piezoelectric transducer 26.

The device thus far described can be used for measuring pressure ratios less than 2.0. For pressure ratios greater than 2.0, an orifice device 32 is provided in the inlet 14. With the device modified in this manner, the measurement of pressure ratios greater than 5 have been demonstrated and it appears that the measurement of pressure ratios of 10 are practical. This device will operate with down stream pressures greater than sea level and down to pressures less than 1.8 inches of mercury with minimal variations and thus the device will be substantially altitude insensitive.

One use for the device is shown in FIG. 4, wherein the inlet 14' of the pressure ratio detector is connected to one of the compressor stages of a turbojet engine 36 with the outlet 16' positioned to sense engine inlet pressure.

The device of the invention will operate where there are wide temperature variations such as may be encountered with turbine engines. The device is temperature sensitive, however, and the temperature will cause a signal change approximately proportional to $K/\overline{T}$, where T is the temperature of the fluid. When the device is used where temperature variations are encountered, such as in a turbojet engine, a temperature sensor 34 may be used to provide a temperature correction factor. While the device has been illustrated for monitoring gas flow, its use with liquid will provide similar results.

There is thus provided a pressure ratio detector which is much smaller with fewer parts required than prior art pressure ratio detectors and which is substantially independent of the absolute pressure level.

I claim:

1. A pressure ratio detector connected between the compressor and the engine inlet of a turbojet engine, comprising: a housing with a fluid flow channel passing through the housing; said housing having an inlet at one end of the flow channel adapted to be connected to a compressor stage of a turbojet engine and an outlet at the other end of the flow channel adapted to be connected to inlet of said turbojet engine; an insert having an orifice for producing a pressure drop in the inlet of said flow channel; a plug in said flow channel; said plug having a flow spreader at the inlet end and a plurality of helical grooves in the outer surface to provide a plurality of helical flow paths in said flow channel; means, between said plug and said outlet, for subjecting the flow to a sudden expansion and inducing a nutation in the flow; means, responsive to the acoustic nutational frequency in the region of said expansion, for converting the acoustic nutational frequency to an electrical output signal; and means, for measuring the temperature of flow at the inlet end of the flow channel.

2. The device as recited in claim 1 wherein said means for converting the acoustic nutational frequency to an electrical output signal includes a pressure sensing piezoelectrical transducer.

* * * * *